US012801258B2

(12) United States Patent
Munaim et al.

(10) Patent No.: US 12,801,258 B2
(45) Date of Patent: Nov. 17, 2026

(54) NON-LINEAR FILTERING OF DISPLAYED VALUE

(71) Applicant: SAP SE, Walldorf (DE)

(72) Inventors: Hood Munaim, Downers Grove, IL (US); Ricardo Hernandez, Newtown Square, PA (US)

(73) Assignee: SAP SE, Walldorf (DE)

( * ) Notice: Subject to any disclaimer, the term of this patent is extended or adjusted under 35 U.S.C. 154(b) by 365 days.

(21) Appl. No.: 18/108,157

(22) Filed: Feb. 10, 2023

(65) Prior Publication Data

US 2024/0272769 A1 Aug. 15, 2024

(51) Int. Cl.
*G06F 3/0482* (2013.01)
*G06F 16/242* (2019.01)

(52) U.S. Cl.
CPC ........ *G06F 3/0482* (2013.01); *G06F 16/2423* (2019.01)

(58) Field of Classification Search
CPC ............................ G06F 3/0482; G06F 16/2423
See application file for complete search history.

(56) References Cited

U.S. PATENT DOCUMENTS 8,209,619 B2 * 6/2012 Carrer ................. G06F 16/9027 709/219
2006/0184892 A1 * 8/2006 Morris .................... G06F 16/94 715/767
2007/0283259 A1 * 12/2007 Barry .................. G06F 16/3323 715/700
2008/0222561 A1 * 9/2008 Helfman ............... G06F 16/957 715/810
2008/0243883 A1 * 10/2008 Rehman ................ G06F 3/0482 707/999.102
2008/0262947 A1 * 10/2008 Buzzell .............. G06Q 30/0633 705/26.7
2009/0254891 A1 * 10/2009 Cui ........................... G06F 8/53 717/138
2010/0064258 A1 * 3/2010 Gorczowski .......... G06F 3/0482 715/841

(Continued)

OTHER PUBLICATIONS

Creating multiple dependent drop-down list in Excel[EASY] (Year: 2021).*

*Primary Examiner* — Hien L Duong
(74) *Attorney, Agent, or Firm* — Buckley, Maschoff & Talwalkar LLC

(57) ABSTRACT

The example embodiments are directed to a system and method that can query of a dependent data set by breaking up the data into smaller pairs. In one example, the method may include storing a dependent data set comprising a plurality of data pairs, detecting input of a value displayed via a first graphical element, identifying a plurality of dependent values of the input value based on a plurality of data pairs, respectively, and dynamically displaying the plurality of dependent values via a second graphical element, detecting input of a second value from among the plurality of dependent values via the second graphical element displayed within the user interface and identifying a plurality of dependent third values that are dependent on the second input value based on a plurality of additional data pairs and dynamically displaying the plurality of third values via a third graphical element.

13 Claims, 7 Drawing Sheets

(56) References Cited

U.S. PATENT DOCUMENTS

| | | | | |
|---|---|---|---|---|
| 2010/0332325 | A1* | 12/2010 | Holte | G06F 16/954 705/14.54 |
| 2015/0032548 | A1* | 1/2015 | Shapiro | G06Q 30/0269 705/14.66 |
| 2015/0235285 | A1* | 8/2015 | Unak | G06F 3/0482 715/738 |
| 2016/0132215 | A1* | 5/2016 | Zhang | G06F 3/0482 715/781 |
| 2017/0177670 | A1* | 6/2017 | Hseush | G06F 16/285 |
| 2018/0300022 | A1* | 10/2018 | Kumar | G06F 16/9535 |
| 2019/0130465 | A1* | 5/2019 | Dalglish | G07F 17/40 |
| 2019/0325499 | A1* | 10/2019 | Rao | G06F 16/248 |
| 2020/0342520 | A1* | 10/2020 | Pandey | G06T 19/003 |
| 2021/0312531 | A1* | 10/2021 | Mcginnis | G06Q 10/087 |
| 2024/0037678 | A1* | 2/2024 | Imbert | G06Q 30/0631 |
| 2024/0266044 | A1* | 8/2024 | Wohlstadter | G16H 10/40 |

* cited by examiner

100

220

230

240

NON-LINEAR FILTERING OF DISPLAYED VALUE

BACKGROUND

Software applications often include graphical elements such as menus, combo boxes, radio buttons boxes, and the like, with a plurality of selectable options. In some cases, the selections that are made within these graphical elements may dynamically configure a list of items that are displayed in other graphical elements in the user interface. For example, the selection made via a first menu may cause one or more menu items to be excluded from a second menu. Likewise, a selection made within the second menu may further cause one or more items in a third menu to be excluded from the third menu.

These types of user interface dependencies are typically stored within a memory of the software application as a linear sequence of selections beginning with a selection made via the first menu which is mapped to a selection made in the second menu, which in turn is mapped to a selection made in the third menu. In this case, even though the selected menu item from the second menu is used to configure the items that are dynamically displayed in the third menu, the software must determine which selections to make available in the third menu based on the selections made in both the first menu and the second menu. Managing such sequential lists of selections can become difficult especially when dealing with many menus and other graphical elements that are interrelated in such ways.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
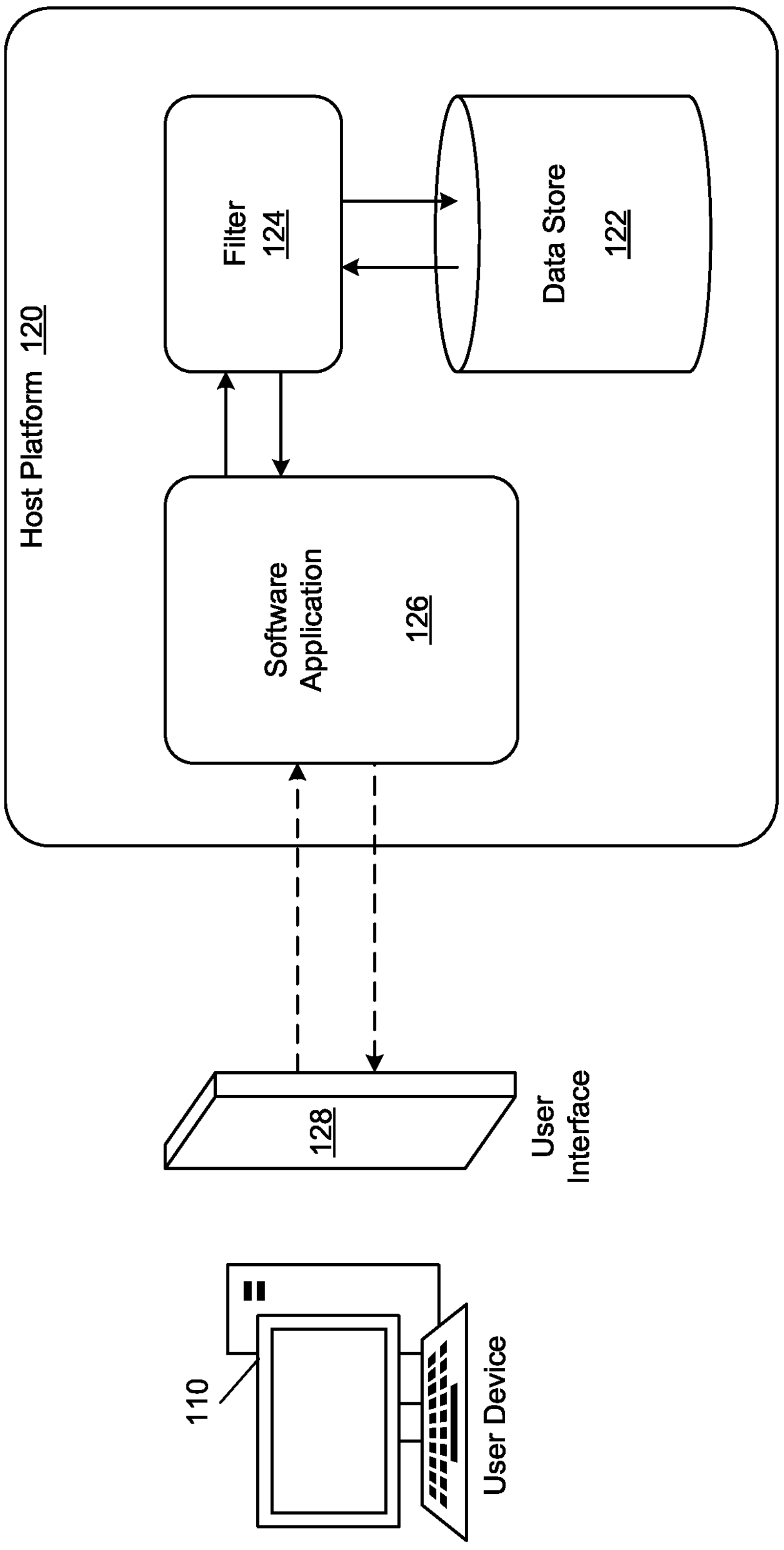
FIG. 1 is a diagram illustrating a host platform for dynamically filtering elements that are displayed via a user interface in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

In order to select a product from a list of products on a website, the user may need to find a store that delivers the product near a location of the user. To do this, the user may need to select a location from a first menu (e.g., a drop-down menu, input field, etc.) of the merchant's website with a mechanism for inputting or otherwise selecting one of multiple possible values (locations). Upon selecting a location, the software may dynamically populate a second menu with menu items of store names at that selected location. Here, the user may then need to select a store from among a list of stores in that location from the second menu. In response to the selected store name, the software may dynamically populate a third menu with menu items of products at that selected store.

Traditionally, software programs store such sequences of paths from a start point (e.g., a location value being entered) to an end point (e.g., a product selected) and any intermediate hops in between including the store selection in this case. A similar path is created for each product available resulting in a significant amount of redundant data that is stored and that is searched during a user interface display process.

The example embodiments are directed to a software application that can break up a sequence of dependent values selected on a user interface into a plurality of pairs of values which are independent from other pairs in the sequence. Each pair includes a linked value with a previous pair. Thus, the software can only search pairs instead of entire sequences of lists. As a result, the software can conserve significant amounts of storage space and data processing capacity as further described below in the examples of FIGS. 2A, 2B, 3A, and 3B.

The data pairs include a one-to-one mapping between two values that are selected in sequence (i.e., the second value is dependent on the first value being selected) on a user interface thereby making them independent from any other one-to-one mappings on the user interface. By breaking the dependencies into pairs, the pairs become smaller and more manageable than the linked sets of values. Referring again to the example above, a first data pair could map a selected location to a selected store and a plurality of second data pair could each one-to-one map the selected store to a different product from among a plurality of products. Accordingly, the display of the menu items in the third menu only becomes dependent on the selection made in the second menu, and not based on the selections made in both the first and second menus. In the back-end, the amount of data that needs to be stored to represent all possible sequences of selections on the user interface can be reduced by about 60-70% at least.

FIG. 1 illustrates a computing environment 100 which includes a host platform 120 that hosts a software application 126 that is accessible to users such as user device 110 over a network in accordance with an example embodiment. In this example, the software application 126 is capable of dynamically filtering elements that are displayed via a user interface 128 of the software application 126 in accordance with an example embodiment. Referring to FIG. 1, a host platform 120 such as a cloud platform, web server, database, or the like, may host a software application 126 such as an enterprise resource planning (ERP) software application commonly used for managing business, accounting, human resources, supply chains, and the like. The embodiments are not limited to any particular type of software application and may be implemented in other forms besides software applications including kiosks, ticket counters, e-commerce sites, and anywhere else where user interface elements are dynamically displayed dependent on interactions of the user with other user interface elements.

In this example, the host platform 120 includes a data store 122 that stores the application data of the software application 126 including any acceptable sequential interactions/selections of values on the user interface 128. The data stored within the data store 122 may be stored in various formats and filtered via a filter 124. As an example, the data may be stored in a format similar to that shown in FIG. 2A. As another example, the data may be stored in a format similar to the shown in FIG. 3A, referred to herein as a "non-linear" format. The filtering process will be different depending on how the data is stored, as further described in the examples of FIGS. 2B and 2C. For example, if the data is stored in the format shown in FIG. 2A, the filter 124 can execute a linear lookup process as shown in FIGS. 2B-2D. As another example, if the data is stored in the format shown in FIG. 3A, the filter 124 can execute a non-linear lookup process.

Figure 2A:
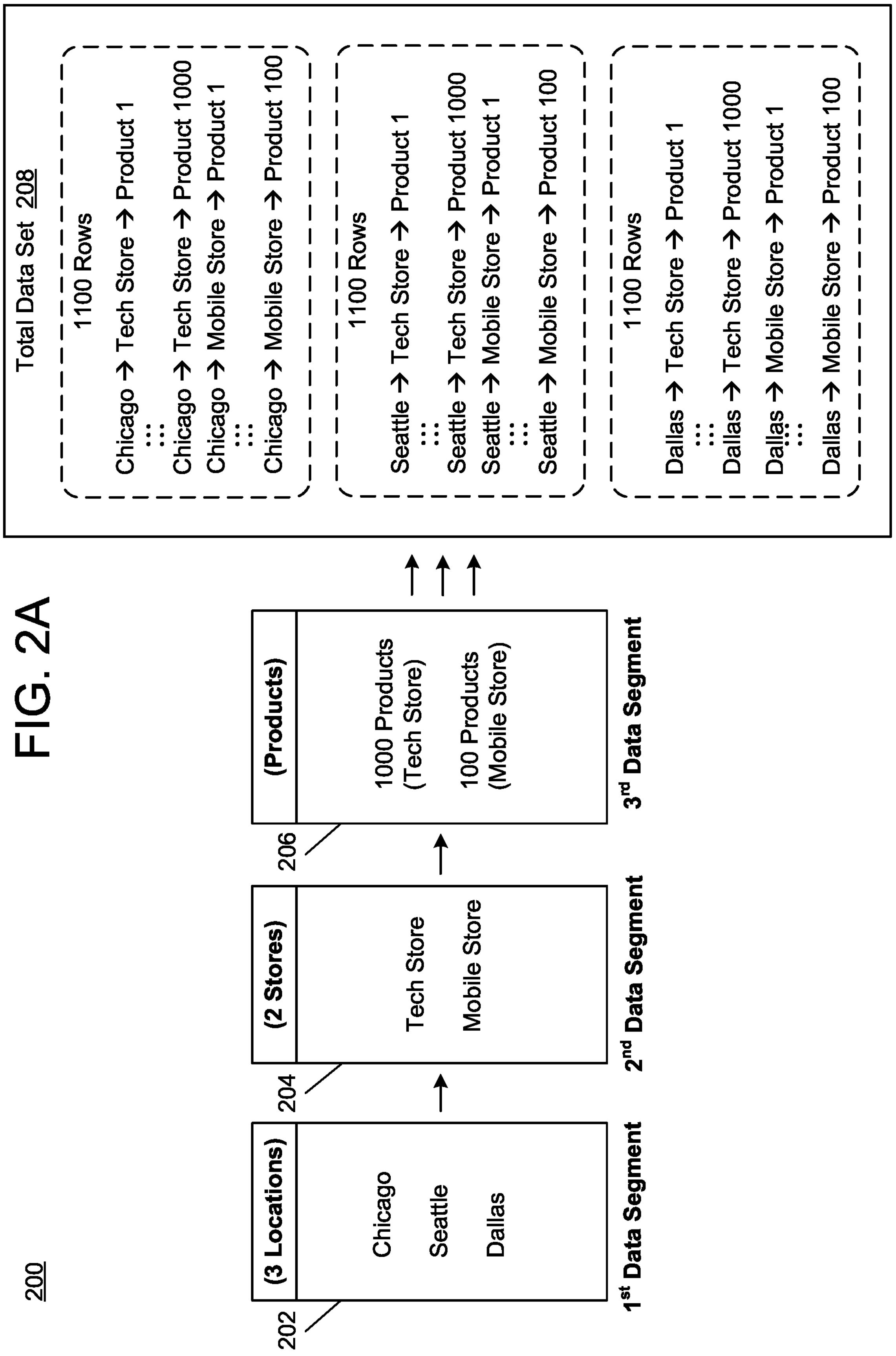
FIG. 2A is a diagram illustrating a process of generating a dependent data set that includes sequential linear mappings between dependent user interface elements in accordance with an example embodiment.
Figure 2B:
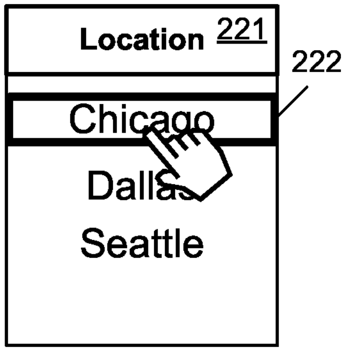
FIGS. 2B-2D are diagram illustrating a process of dynamically displaying data via a user interface based on the dependent data set in FIG. 2A, in accordance with an example embodiment.
Figure 2C:
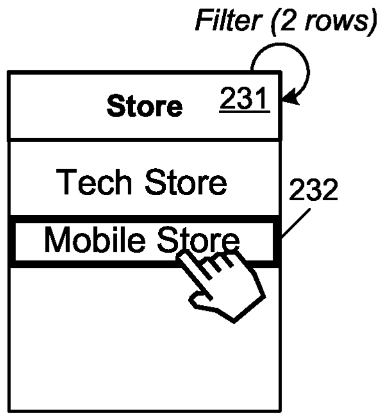
Figure 2D:
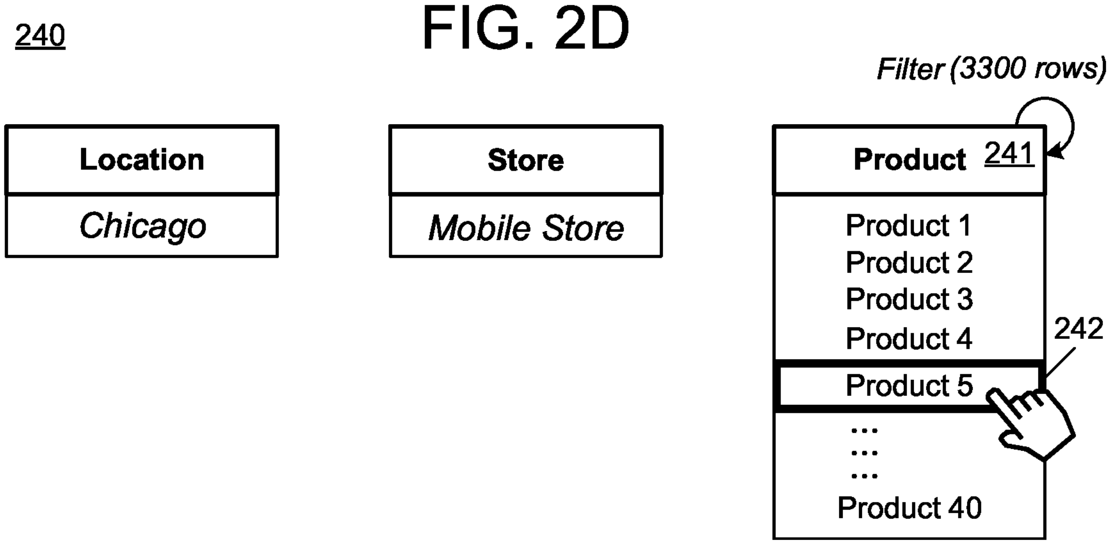

FIG. 2A illustrates a process 200 of generating a dependent data set 208 that includes sequential linear mappings between dependent user interface elements in accordance with an example embodiment, and FIGS. 2B-2D illustrates an end-to-end process of dynamically displaying data via a user interface based on the dependent data set in FIG. 2A, in accordance with an example embodiment. Referring to FIGS. 2B-2D, menu items of a second menu 231 are dynamically configured based on a selection/input based on a first menu 221, and menu items of a third menu 241 are dynamically configured based on a selection/input based on the second menu 231. In other words, the software may dynamically decide which menu items to include inside the second menu 231 and the third menu 241 based on selections made in the first menu 221 and the second menu 231, respectively, Referring to FIG. 2A, the dependent data set 208 includes the data in a format for filtering by the application when deciding which menu items (i.e., display values) to include in the respective menu. For example, the sequences stored in the dependent data set 208 may be represented by sequences of data values where each sequence includes a value from each of a plurality of data segments such as data segments 202, 204, and 206, respectively, in a dependent order. Each of the data values stored in the data segments 202, 204, and 206 corresponds to a different menu item within a different menu, respectively, in this example. The data segments 202, 204, and 206 correspond to selections on a user interface for identifying a product within a store. For example, the data segment 202 corresponds to the menu items in the first menu 221, the data segment 204 corresponds to the menu items in the second menu 231, and the data segment 206 corresponds to the menu items in the third menu 241. Here, the menu items include three possible geographic locations in the data segment 202/first menu 221, two possible store types in the data segment 204/second menu 231, and 1100 possible products in the data segment 206 including 1000 of products specific to a first store type and 100 products specific to a second store type.

To look at details of a product, the user may select a product value 242 via the third menu 241. To do so, the user must first select a geographic location value 222 via the first menu 221 via a process 220 shown in FIG. 2B, followed by a selection of a store location value 232 via the second menu 231 via a process 230 shown in FIG. 2C, and a product value 242 of interest via the third menu 241 as shown via a process 240 in FIG. 2D. In response, the product details for the selected product may be populated within the user interface (not shown).

In this example, the dependent data set 208 includes mappings for all possible sequences in the form of linear sequences. In this example, the second menu 231 provides two possible options for store types with two possible sets of products displayed dynamically in the third menu 241 include 1000 product types if a "Tech Store" menu item is selected, and 100 possible products if a "Mobile Store" menu item is selected. Each of the 1000+100 possible products are stored as values in the data segment 206 and are linked back to the data segment 202 corresponding to the first menu 221, via the data values stored in the data segment 204. Here, the dependencies go all the way back to the first menu/first data segment even though the products types that are displayed are not dependent on the selection made in the first menu but rather the selection made via the second menu 231.

In FIGS. 2A-2D, each city in the data set has the same two store types and a total of 1100 products with 100 products being sold by a first store and 1000 products being sold by a second store. As a result, each city will have a data set that includes 1100 linear sequences of data values between the data segment 202 to the data segment 206, via the data segment 204. These sequential lists include significant redundancies.

Referring again to FIGS. 2B-2D, when the user selects a value in the first menu 221 and another value in the second menu 231, the user will arrive at the third menu 241. In order for the software to display the dependent menu items in the third menu 241, the software must load, access, and read the 3300+ rows of data in the dependent data set 208 to dynamically choose which menu items to include in the third menu 241. Here, the software (e.g., filter 124) may scan the dependent data set 208 to filter out/exclude menu items from the third menu 241 based on the selections made by the first menu 221 and the second menu 231.

Figure 3A:
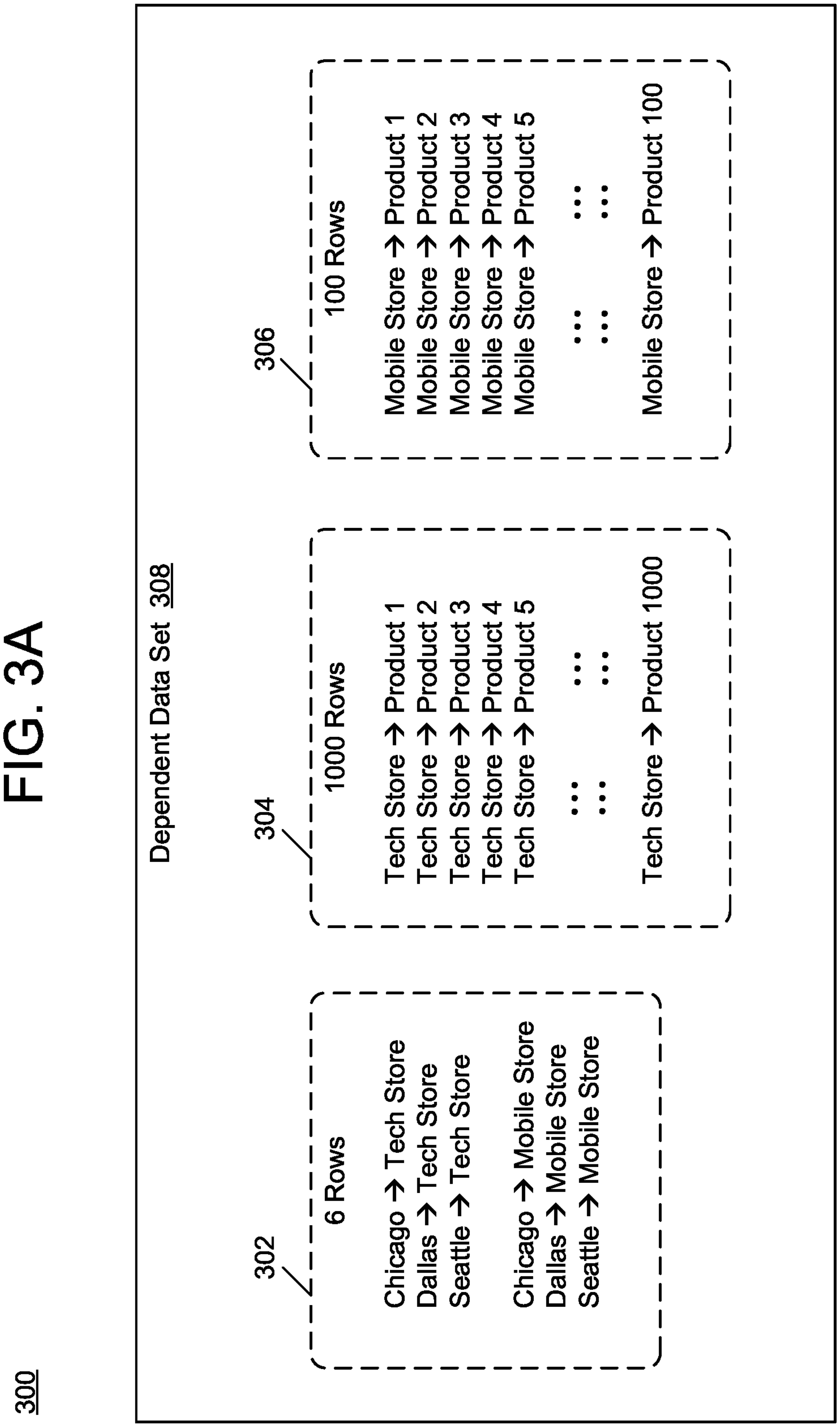
FIG. 3A is a diagram illustrating a process of generating a dependent data set that is broken up into dependent data sequence pairs in accordance with an example embodiment.
Figure 3B:
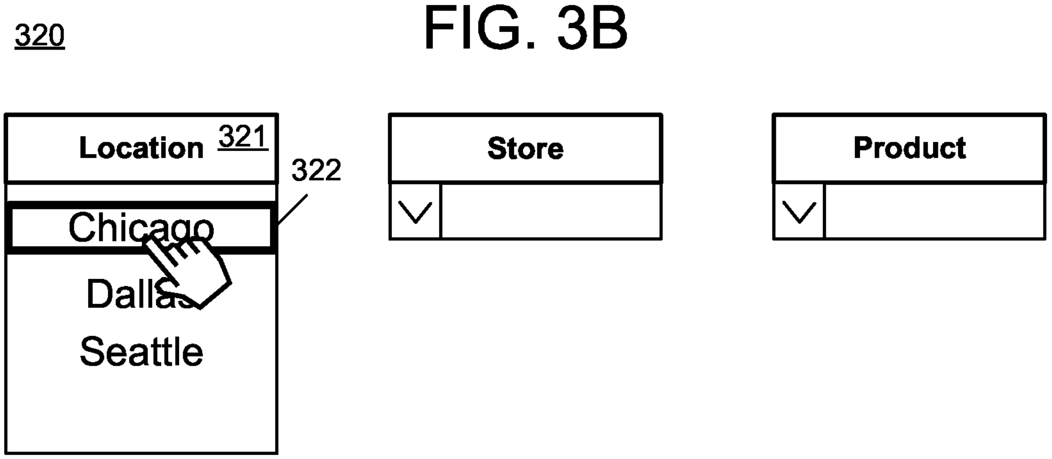
FIGS. 3B-3D are diagrams illustrating a process of dynamically displaying data via a user interface based on the dependent data set in FIG. 3A, in accordance with an example embodiment.
Figure 3C:
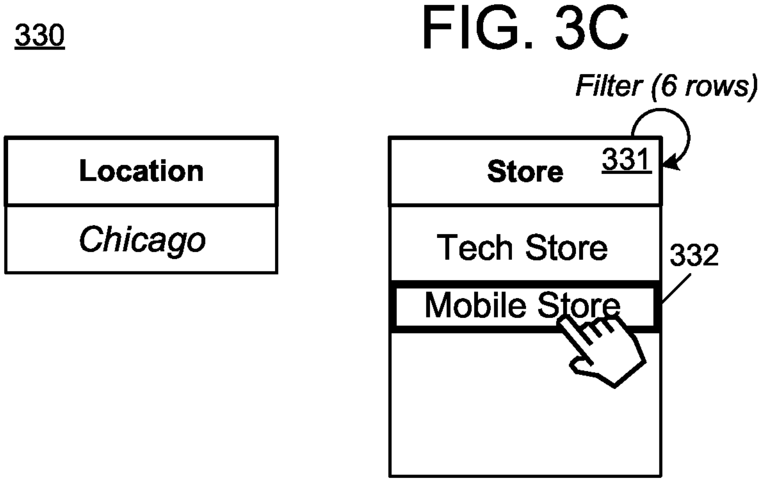
Figure 3D:
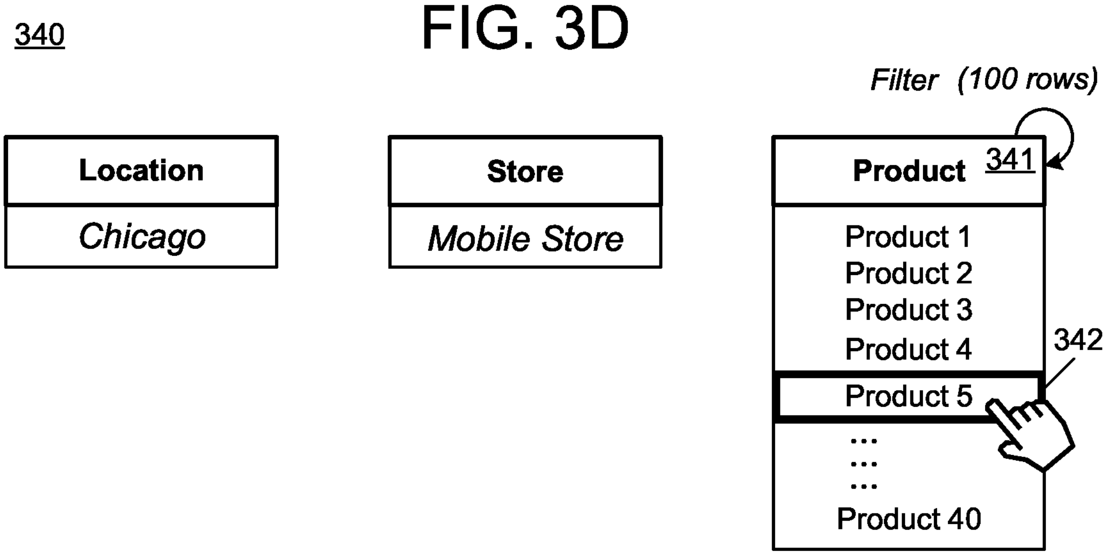

FIG. 3A illustrates a process 300 of building a dependent data set 308 by breaking up the dependent data set 208 shown in FIG. 2A into sets of dependent data sequence pairs in accordance with an example embodiment, and FIGS. 3B-3D illustrate a process of dynamically displaying data via a user interface based on the dependent data set in FIG. 3A, in accordance with an example embodiment. In the example of FIG. 3A, an initial dependent data set such as dependent data set 208 or data segments 202, 204, and 206 shown in FIG. 2A, can be broken up into smaller subsets of sequence pairs that are more reusable and require less data loading and less processing during user interface retrieval/display operations. In particular, by breaking up continuous sequences of dependencies into smaller sub-sequences or pairs, the data becomes easier to manage.

In FIG. 3A, there are data sets 302, 304, and 306 that take the place of the data segments 202, 204, and 206 shown in FIG. 2A. Here, the data sets 302, 304, and 306 each include different dependent data pairs that represent two different data values from two different user interface elements (e.g., menus, etc.) that are dependent on each other and in sequence. For example, in FIG. 3A, the data set 302 includes all three geographic location values mapped to both store types. However, to do this, the system creates a number of one-to-one mappings between sequential data values and partially overlaps the dependencies in each of the data sets 304 and 306.

For example, in the data set 302, each location value is mapped on a one-to-one basis to each possible store type that is dependent on the location. In this case, the Chicago location includes two store types (Tech Store and Mobile Store), and so do each of the Dallas location and the Seattle location. In this example, each of the different locations are one-to-one mapped to each of the different store types resulting in a total of six (6) rows of mappings. In the data set 304, a first store type is one-to-one mapped to all product types specific to that store type resulting in 1000 rows of data mappings (for 1000 product types), and in the data set 306, a second store type is one-to-one mapped to different product types specific to that store type resulting in another 100 rows of data mappings (for 100 different product types at the Mobile Store). The result is a total data set of 1000+100+6=1106 rows of data values in comparison to the 3300+ rows of data values in the data set of FIG. 2A.

The examples in both FIG. 2A and FIG. 3A refer to only three data segments. These examples are for ease of understanding. It should also be appreciated that the solution described herein may be applied to more than three data segments including four or more data segments. Furthermore, while the data segments in FIGS. 2A and 3A correspond to menus in a graphical user interface, it should also be appreciated that the data elements used in the data sections may be something other than menu items such as data stored in another/separate system which is queried. During the query process, the system may filter down data to display to the user, a filtering process may occur. In some embodiments, the process may run in a background of the host platform. In this example, the backend process does not need to go through a user interface, but rather may execute on its own without being triggered by a user or via a user interface. As an example, the backend process may run automatically for purposes of validation such as validating a combination of values selected via fields of a software application.

Furthermore, in the example of FIG. 3A, two values from two different menus/data segments are mapped together in each of the data sets 302, 304, and 306. This is possible because data set 306 depends on data set 304, and data set 304 depends on data set 302. It should also be appreciated that there are examples where some of the data sets are not dependent on other data sets, or they have different dependencies. In this case, the solution can generate different combinations of data segments and map them together.

For example, a user interface may provide three menus with three different sets of menu items that can be selected for Country, State, and City, respectively. The same user interface may also provide menus with separate menu items for Store and Product. In this example, the menu items that are displayed within the menus for Store and Product are dependent on a menu item selected from the menu for Country, but not dependent on values selected for State or City. The solution may develop two different mappings for these two different dependencies. For example, a first mapping may include combinations of values from Country, State, and City, and a second mapping may include combinations of values from Country, Store, and Product. As such, the solution can support independent fields and dependent fields to be put together in a data set. Furthermore, some segments may be included in multiple mappings. In the example above, the Country selection has two branches of dependencies including State and City, as well as Store and Product.

FIGS. 3B-3D illustrate some of the benefits that result from breaking up the sequential lists/sequences in the dependent data set 208 into smaller sub-sequences of dependent data pairs in the dependent data set 308. In doing so, the solution can load less data during user interface filtering and also read less data during an excluding process when deciding which menu items (or other elements) to dynamically exclude from a menu. For example, FIG. 3B illustrates a process 320 of selecting a menu item 322 from a first menu 321, FIG. 3C illustrates a process 330 of selecting a menu item 332 from a second menu 331, and FIG. 3D illustrates a process 340 of selecting a menu item 342 from a third menu 341.

In FIG. 3C, the user has two choices including a Tech Store and a Mobile Store. Depending on which store type the user selects via the second menu 331, the filter will exclude different menu items from the third menu 341. In particular, the two store types will cause the filter to exclude two different sets of menu items from the third menu 341. In particular, if the user selects the Tech Store from the third menu 341 in FIG. 3C, the software will filter out and exclude the 100 product values/names assigned to the Mobile Store and only display the 1000 products assigned to the Tech Store. Likewise, if the user selects Mobile Store from the third menu 341, as shown in FIG. 3C, the software will filter out the 1000 products assigned to the Tech Store and only display the 100 items/products within the third menu 341 corresponding to the Mobile Store.

As further noted in FIG. 3D, in order to filter the product types and arrive at the correct menu items in the third menu 341, the software only has to load 1106 rows of data instead of 3300+ rows of data mappings. This is significantly less data that needs to be stored, loaded, and accessed during the user interface selection process. As a result, the user interface processing becomes faster, more efficient, and more lightweight.

Figure 4:
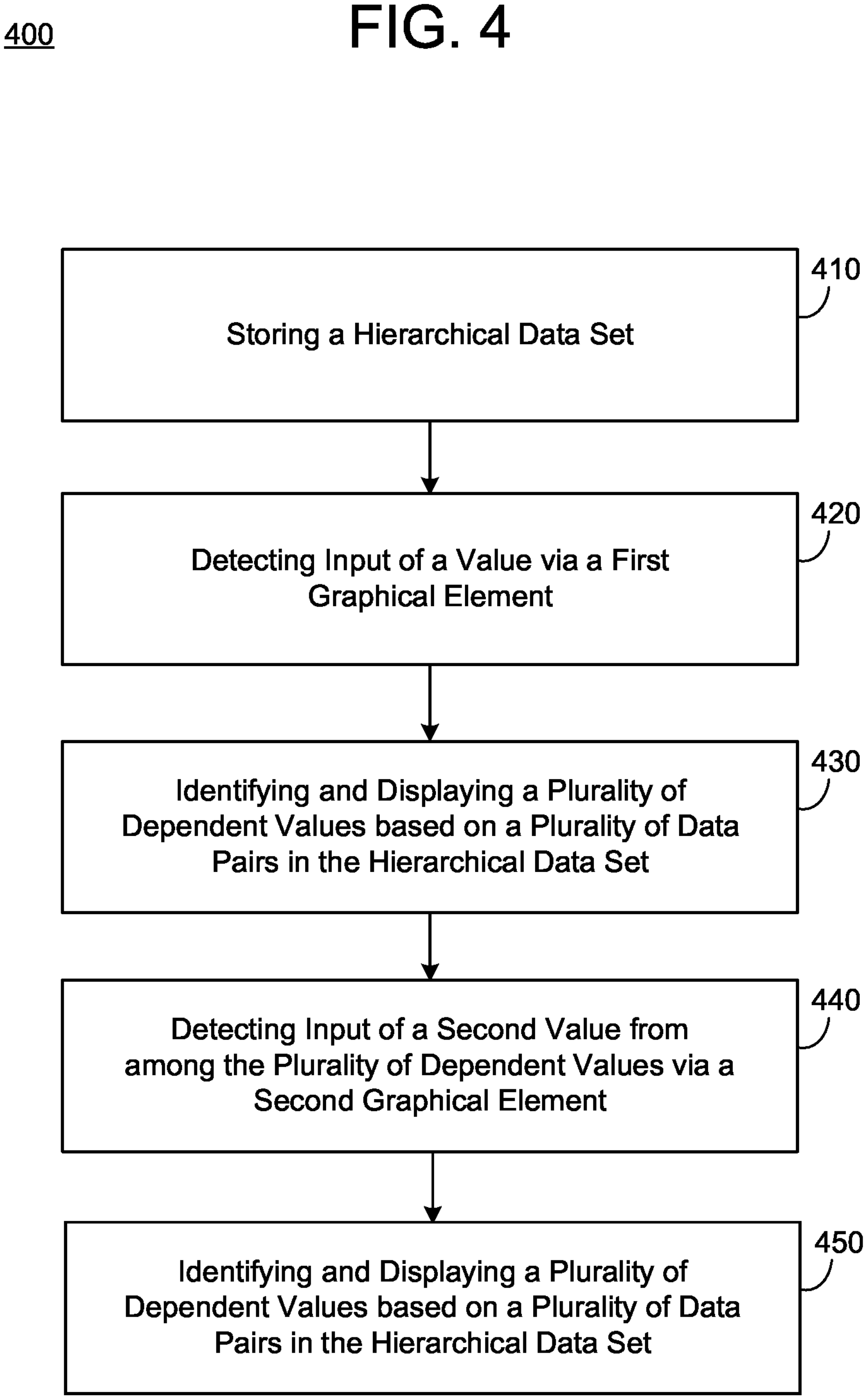
FIG. 4 is a diagram illustrating a method of executing a dynamic non-linear filtering of user interface elements in accordance with an example embodiment.

FIG. 4 illustrates a method 400 of executing a dynamic non-linear filtering of user interface elements in accordance with an example embodiment. For example, the method 400 may be performed by a software application hosted by a host platform such as a cloud platform, a web server, a distributed system, a database, or the like. Referring to FIG. 4, in 410, the method may include storing, via a storage device of a software application, a dependent data set. The dependent data set may include data that represents sequences of selections that can be made on a user interface via one or more graphical elements such as menus, buttons, boxes, control buttons, etc.

In 420, the method may include detecting input of a value from among a plurality of values displayed via a first graphical element within a user interface of the software application. In 430, the method may include identifying a plurality of dependent values that are dependent on the input value based on a plurality of data pairs stored in the data set which each map the value to a different dependent value from among the plurality of dependent values, respectively, and dynamically displaying the plurality of dependent values via a second graphical element within the user interface.

In 440, the method may include detecting input of a second value from among the plurality of dependent values via the second graphical element displayed within the user interface. In 450, the method may include identifying a plurality of third values that are dependent on the second input value based on a plurality of additional data pairs stored in the data set which each map the second value to a different third value from among the plurality of third values, respectively, and dynamically displaying the plurality of third values via a third graphical element displayed within the user interface.

In some embodiments, the method may further include receiving the dependent data set including a plurality of linear sequences of user interface selections, and breaking-up the plurality of dependent linear sequences into multiple pluralities of sequential sub-sequences that are represented as data pairs. In this example, each linear sequence may include a sequence of N data values which are sequentially dependent on each other, respectively, and the breaking-up comprises generating N−1 data value pairs for each linear sequence set by breaking up the sequence of N data values into N−1 data pairs in a partially overlapping sequence.

In some embodiments, the first graphical element may include a first menu embedded within a page of the software application, and the second graphical element may include a second menu embedded within the page of the software application. In this example, the dynamically displaying the plurality of dependent values may include displaying a plurality of menu entries within the second menu based on a selection of a menu entry within the first menu and a plurality of data pairs which each map the respective menu entry to a different menu entry from among the plurality of menu entries. In some embodiments, the method may include generating the dependent data set by converting an initial dependent data set into a two or more pluralities of data pairs which map together two or more different levels of data in the initial dependent data set.

In some embodiments, the method may further include filtering out data pairs from among a plurality of data pairs on a predefined level in the dependent data set based on the selected value to map the selected value to the plurality of dependent values, in response to receipt of the input value. In some embodiments, the method may further include filtering out data pairs from among a second plurality of data pairs on a level below the predefined level in the dependent data set based on the second value to map the second value to the plurality of third values, in response to receipt of the second input value.

Figure 5:
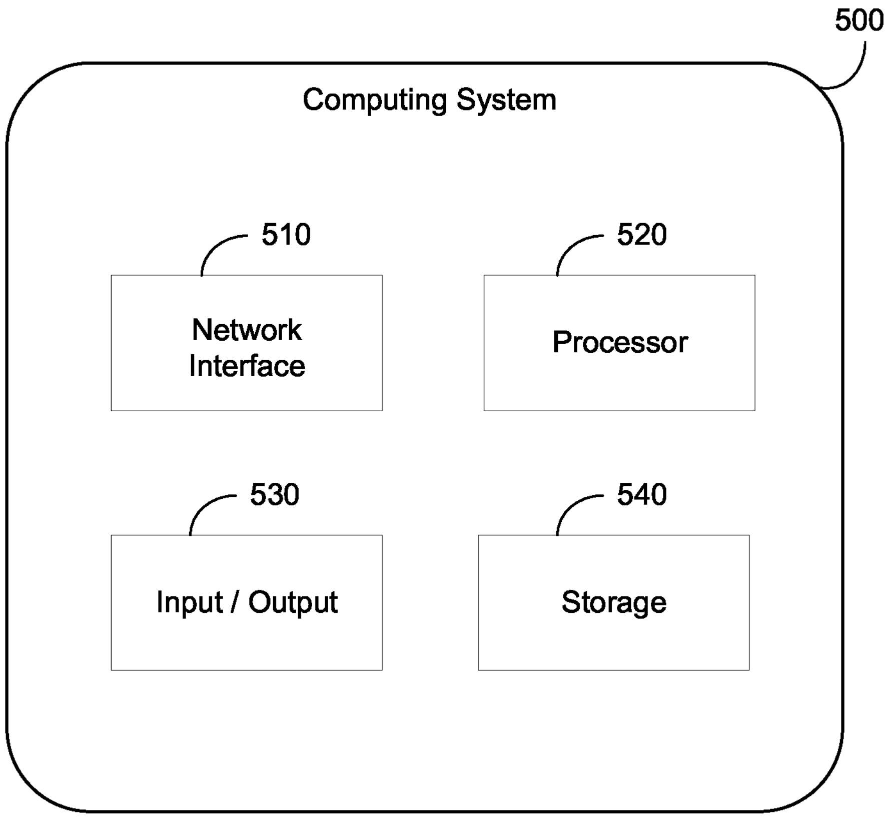
FIG. 5 is a diagram illustrating a computing system for use in the examples herein in accordance with an example embodiment.

FIG. 5 illustrates a computing system 500 that may be used in any of the methods and processes described herein, in accordance with an example embodiment. For example, the computing system 500 may be a database node, a server, a cloud platform, or the like. In some embodiments, the computing system 500 may be distributed across multiple computing devices such as multiple database nodes. Referring to FIG. 5, the computing system 500 includes a network interface 510, a processor 520, an input/output 530, and a storage 540 such as an in-memory storage, and the like. Although not shown in FIG. 5, the computing system 500 may also include or be electronically connected to other components such as a display, an input unit(s), a receiver, a transmitter, a persistent disk, and the like. The processor 520 may control the other components of the computing system 500.

The network interface 510 may transmit and receive data over a network such as the Internet, a private network, a public network, an enterprise network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable. The input/output 530 may include an interface, a port, a cable, a bus, a board, a wire, and the like, for inputting and outputting data to and from the computing system 500. For example, data may be output to an embedded display of the computing system 500, an externally connected display, a display connected to the cloud, another device, and the like. The network interface 510, the input/output 530, the storage 540, or a combination thereof, may interact with applications executing on other devices.

The storage 540 is not limited to a particular storage device and may include any known memory device such as RAM, ROM, hard disk, and the like, and may or may not be included within a database system, a cloud environment, a web server, or the like. The storage 540 may store software modules or other instructions which can be executed by the processor 520 to perform the methods described herein. According to various embodiments, the storage 540 may include a data store having a plurality of tables, records, partitions and sub-partitions. The storage 540 may be used to store database records, documents, entries, and the like.

According to various embodiments, the storage 540 may store a software application and a dependent data set that is used for configuring dynamic display of items on a graphical user interface. The processor 520 may detect selection of a value from among a plurality of values displayed via a first graphical element within a user interface of the software application. In some embodiments, the processor 520 may map the selected value to a plurality of dependent values based on a plurality of data pairs stored in the data set which each map the value to a different one of the plurality of dependent values, respectively, and dynamically display the plurality of dependent values via a second graphical element within the user interface.

In some embodiments, the processor 520 may detect selection of a second value from among the plurality of dependent values via the second graphical element displayed within the user interface. In addition, the processor 520 may map the selected second value to a plurality of third values based on a plurality of additional data pairs stored in the data set which each map the second value to a different one of the plurality of third values, respectively, and dynamically display the plurality of third values via a third graphical element displayed within the user interface.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
- a storage configured to store a software application and a dependent data set including a plurality of dependent linear sequences of data values; and
- a processor configured to:
  - configure the dependent data set including the plurality of linear sequences of data values into a plurality of data subsets each including a plurality of data sequence pairs of the dependent values stored in the dependent data set, the data sequence pairs mapped and corresponding to two different data values from two different user interface elements;
  - detect selection of a value from among a plurality of values displayed via a first graphical element within a user interface of the software application,
  - filter out during a data load process, in response to the detection of the selected value, one or more of the plurality of data subsets that exclude a mapping to the selected value;
  - dynamically display the plurality of dependent values mapped to the selected value via a second graphical element within the user interface;
  - detect selection of a second value from among the plurality of dependent values displayed via the second graphical element within the user interface;
  - filter out during a data load process, in response to the detection of the selected second value, one or more of the plurality of data subsets that exclude a mapping to the selected second value;
  - dynamically display a plurality of third values mapped to the selected second value via a third graphical element displayed within the user interface.

2. The computing system of claim 1, wherein each linear sequence includes a sequence of N data values which are sequentially dependent, respectively, and the processor is configured to generate N−1 data value pairs for each linear sequence by breaking up the sequence of N data values into N−1 data pairs in a partially overlapping sequence, wherein N is a positive integer equal to or greater than 1.

3. The computing system of claim 1, wherein the first graphical element includes a first menu embedded within a page of the software application, and the second graphical element includes a second menu embedded within the page of the software application.

4. The computing system of claim 3, wherein the processor is configured to dynamically display a plurality of menu entries within the second menu based on a selection of a menu entry within the first menu and a plurality of data pairs which map the menu entry to the plurality of menu entries.

5. The computing system of claim 1, wherein the configuring of the dependent data set by includes converting the dependent data set including the plurality of linear sequences of data values into a plurality of partially overlapping data sequence pairs which map together two sequential values therein and include one value from a previous data sequence pair.

6. A method comprising:
- storing, via a storage device of a software application, a dependent data set including a plurality of dependent linear sequences of data values;
- configuring the dependent data set including the plurality of linear sequences of data values into a plurality of data subsets each including a plurality of data sequence pairs of the dependent values stored in the dependent data set, the data sequence pairs mapped and corresponding to two different data values from two different user interface elements;
- detecting input of a value from among a plurality of values displayed via a first graphical element within a user interface of the software application;
- filtering out during a data load process, in response to the detected value, one or more of the plurality of data subsets that exclude a mapping to the detected value;
- dynamically displaying the plurality of dependent values mapped to the input value via a second graphical element within a user interface, detecting input of a second value from among the plurality of dependent values displayed via the second graphical element within the user interface;
- filtering out during a data load process, in response to the detection of the second input value, one or more of the plurality of data subsets that exclude a mapping to the detected second value;
- dynamically displaying a plurality of third values mapped to the detected second input value via a third graphical element displayed within the user interface.

7. The method of claim 6, wherein each linear sequence includes a sequence of N data values which are sequentially dependent on each other, respectively, and the generating comprises generating N−1 data value pairs for each linear sequence set by breaking up the sequence of N data values into N−1 data pairs in a partially overlapping sequence, wherein N is a positive integer equal to or greater than 1.

8. The method of claim 6, wherein the first graphical element comprises a first menu embedded within a page of the software application, and the second graphical element comprises a second menu embedded within the page of the software application.

9. The method of claim 8, wherein the dynamically displaying the plurality of dependent values includes displaying a plurality of menu entries within the second menu based on a selection of a menu entry within the first menu and a plurality of data pairs that each map the respective menu entry to a different menu entry from among the plurality of menu entries.

10. The method of claim 6, wherein the configuring of the dependent data set includes converting the dependent data set including the plurality of linear sequences of data values into a plurality of partially overlapping data sequence pairs which map together two sequential values therein and include one value from a previous data sequence pair.

11. A non-transitory computer-readable medium comprising instructions which when executed by a processor cause a computer to perform a method comprising:

configuring a dependent data set including a plurality of linear sequences of data values into a plurality of data subsets each including a plurality of data sequence pairs of the dependent values stored in the dependent data set, the data sequence pairs mapped and corresponding to two different data values from two different user interface elements;

detecting input of a value from among a plurality of values displayed via a first graphical element within a page of a software application, filtering out during a data load process, in response to the detected input value, one or more of the plurality of data subsets that exclude a mapping to the detected value;

dynamically displaying the plurality of dependent values mapped to the input value via a second graphical element within the page of the software application, detecting input of a second value from among the plurality of dependent values displayed via the second graphical element within the user interface;

filtering out during a data load process, in response to the detection of the second value, one or more of the plurality of data subsets that exclude a mapping to the detected second value;

dynamically displaying a plurality of third values mapped to the detected second input value via a third graphical element displayed within the user interface.

12. The non-transitory computer-readable medium of claim 11, wherein each linear sequence includes a sequence of N data values which are sequentially dependent on each other, respectively, and the breaking-up comprises generating N−1 data value pairs for each linear sequence set by breaking up the sequence of N data values into N−1 data pairs in a partially overlapping sequence, wherein N is a positive integer equal to or greater than 1.

13. The non-transitory computer-readable medium of claim 11, wherein the first graphical element comprises a first menu embedded within a page of the software application, and the second graphical element comprises a second menu embedded within the page of the software application.

* * * * *